E. O. KEATOR.
ROD, ROPE, AND CABLE CLIP.
APPLICATION FILED MAR. 14, 1918.
1,283,792.
Patented Nov. 5, 1918.
2 SHEETS—SHEET 1.
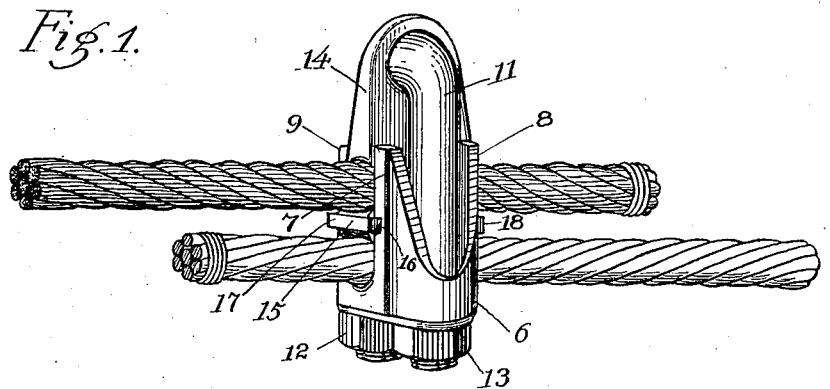
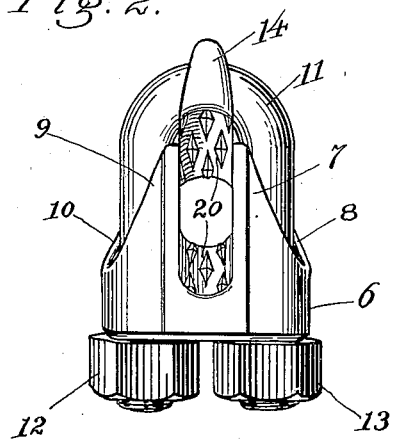
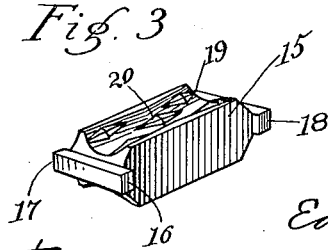
Witnesses:
Inventor:
Edward O. Keator
By
Walter F. Murray
Attorney.

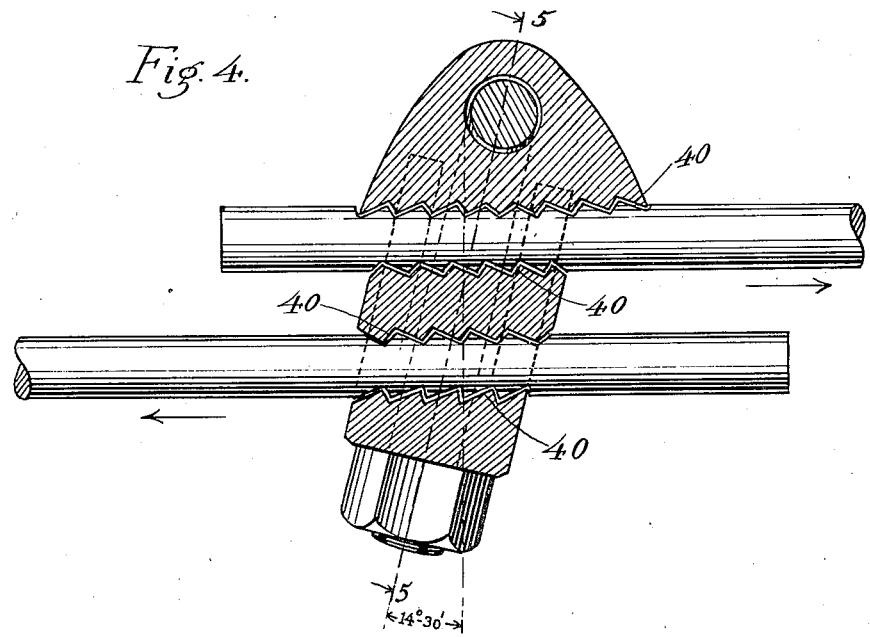
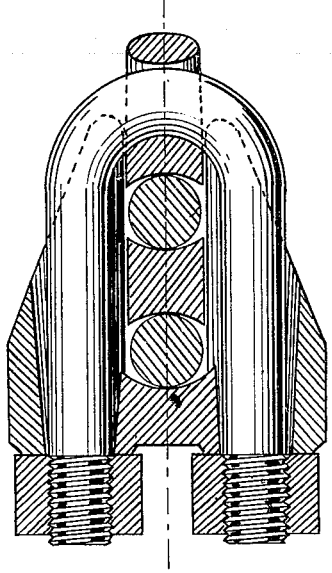

UNITED STATES PATENT OFFICE.

EDWARD O. KEATOR, OF MARION, INDIANA.

ROD, ROPE, AND CABLE CLIP.

1,283,792.　　　　Specification of Letters Patent.　　Patented Nov. 5, 1918.

Application filed March 14, 1918.　Serial No. 222,445.

*To all whom it may concern:*

Be it known that I, EDWARD O. KEATOR, a citizen of the United States of America, and resident of Marion, in the county of Grant and State of Indiana, have invented a new and useful Improvement in Rod, Rope, and Cable Clips, of which the following is a specification.

An object of my invention is to produce an improved clip for rods, ropes or cables, which will grip the ends of such members in a manner such that there is no liability of slippage occurring between the members, with no accompanying damage to the members due to the gripping action of the clip, as in other clips.

A further object is to produce an improved clip in which the structural strength is greatly increased without adding materially to the weight or cost of the clip, while simultaneously rendering it capable of greater gripping power.

A further object is to produce an improved clip in which the initial angular set position assumed by ordinary clips upon a load being brought to bear upon the members gripped by it, is provided for by constructing my improved clip to overcome this initial angular setting action.

These and other objects are attained in the clip described in the following specification and illustrated in the accompanying drawings in which;

Figure 1 is a perspective view of my improved clip having sections of right and left hand twist cable held in position thereby to illustrate the adaptability of my clip to the gripping of cables of either form.

Fig. 2 is a perspective view of a portion of my improved clip, one of the members thereof being removed and others moved to different positions to facilitate the disclosure of details of my invention.

Fig. 3 is a perspective view of the member removed from the clip as shown in Fig. 2.

Fig. 4 is a sectional view of another form of my clip taken on the line 4—4 of Fig. 5.

Fig. 5 is a sectional view taken on the line 5—5 of Fig. 4.

My improved clip in both of the illustrated forms consists of a U-bolt, a cam and a base mounted on the U-bolt, a spacer block located between the cam and the base and between the branches of the bolt, and nuts mounted on the branches of the bolt.

Fig. 1 illustrates a clip designed particularly for cables and ropes of either right or left hand twist, sections of each style of cable being shown in position in the clip to illustrate its adaptability thereto. The base 6 of the clip is provided with wings 7 and 8, and 9 and 10, the inner faces of the pair 7 and 8 being parallel with the inner faces of the pair 9 and 10, the space between the pairs being of the size of the cable for which the clip is designed. Between wings 7 and 8 and between wings 9 and 10, I have provided apertures through the base for the reception of the branches of the U-bolt 11, the ends of which are adapted to extend through the base and are screw threaded to receive the nuts 12 and 13. At the bend of the U-bolt I have provided the cam 14 which extends between the pairs of wings and is of the same thickness as the width of the space between the pairs of wings. Between the cam and base I have provided the spacer block 15 which is also of the same width and length as the space and which is provided with lugs 16, 17, 18 and 19 for engagement with the outer faces of the wings to prevent displacement of the block when in position on the wings as shown in Fig. 1.

The upper and under surfaces of the spacer block are curved to fit the shape of the cable for which the clip is designed, as are also the cable-engaging surfaces of the base and cam. These surfaces are provided with cable-engaging projections 20 which are formed by grooving the surfaces to follow the strands of right hand twisted cables as well as to follow the strands of left hand twisted cables. The projections are consequently diamond shaped.

I have found that superiority of gripping action is obtained by these projections as compared with the usual spirally grooved clip, since the projections enter between the strands, fitting into the hollows, and pressing upon the cable at several points of contact without injuring it, and at the same time breaking up the usual continuous ridges produced by the single grooving construction, thus preventing the twisting slipping tendency of cables clamped in the usual type of clip.

An additional advantage attained by my improved form of clip is that the spacer block prevents the cables from contacting each other. In the old form of clip the cables are held in contact with one another. This has been found to be injurious to the cables because they are crushed and consequently deformed, with no means provided for preventing them from slipping, other than the spiral grooves usually provided. The nonconformance of curvature of the cables to one another together with the conflicting twists, also causes the strands thereof to be cut and worn. This is overcome by the spacer block of my improved construction. The parallel inner faces of the wings of my improved construction coöperate with the curved cable-engaging faces of the base, block and cam in preventing deformation of the cables.

Added strength of construction is also obtained by the bracing effect given the base of the clip by the wings engaging the sides of the block and cam. This greatly reinforces the base and permits the nuts to be drawn up to a sufficient extent without causing the base to bend.

Thus there are three distinct points of novelty distinguishing my improved clip from other clips known to me.

In the form of clip disclosed in Figs. 4 and 5 the projections 40 are of the saw tooth shape shown in Fig. 4 and extend across the object-engaging curved surfaces instead of in the form and direction shown in Fig. 2. This formation is designed for gripping rods instead of cables, the mechanical effect upon the rods being shown greatly exaggerated in Fig. 4 for purposes of illustration. Another distinguishing feature of the form of clip shown in Figs. 4 and 5 is that I have so slanted the rod-engaging surfaces that the axial center of the clip, represented by the line 5—5 of Fig. 4, lies at an angle from the right angle position of clips of ordinary construction when they are initially clamped upon the rods or ropes to be gripped by them. I have determined that ordinary clips, after having been positioned on the rods or cables, when tension is placed upon the elements, assume an angular position, due to slippage, setting of the clip elements to firmer gripping positions, etc. The angle of this position would continue to become greater as the tension upon the rods continues to increase, until at about the angle of 45° the U-bolt would break. It would obviously be the thing to do to apply the clip to the rods in the first place at such an angle, but since the clip would obviously slip back toward a right angle position with the rods, upon attempting to tighten it, the clip will have to be secured at that angle at which further slipping of the clip or slipping between the rods is prevented by reason of the friction between them. This angular position I have found to be approximately 14° 30′. Therefore, the clip disclosed in Figs. 4 and 5 has been constructed to initially account for this setting action of ordinary clips, and when once clamped upon the rods, positively prevents their slippage relatively to one another or further setting action of the clip.

Having thus described my invention, what I claim is:

1. A rod or rope clip comprising a U-shaped bolt, a cam rotatively mounted at the base of the bolt, a base reciprocally mounted on the branches of the bolt and having parallel wings extending toward the cam and spaced apart substantially the thickness of the cam, adapted to permit movement of the cam between them, and nuts on the branches of the bolt adapted to move the base toward the cam to effect reciprocation thereof.

2. A rod or rope clip comprising a U-shaped bolt, a cam rotatively mounted at the base of the bolt, a base reciprocally mounted on the branches of the bolt and having wings thereon spaced apart substantially the thickness of the cam, adapted to permit movement of the cam between them, means on the branches adapted to move the base toward the cam, and a block located between the cam, the base and the wings, adapted to be clamped between the rods or ropes gripped by the clip.

3. A rod or rope clip comprising a bolt, a cam rotatively mounted thereon, a base reciprocally mounted on the bolt adjacent to the cam, said base having wings thereon spaced apart to permit the cam to move between them, and means on the bolt adapted to move the base toward the cam.

4. A rod or rope clip comprising a bolt, a cam rotatively mounted on the bolt, a base reciprocally mounted on the bolt adjacent to the cam and having wings thereon spaced apart substantially the thickness of the cam and adapted to permit movement of the cam between them, a nut on the bolt adapted to move the base toward the cam, and a block between the rods or ropes gripped by the clip.

5. A rod or rope clip comprising a bolt, a cam upon the bolt, a block between the cam and the base, and means upon the bolt adapted to move the base and block toward each other and the cam, the object-engaging surfaces of the cam, the block, and the base having object-engaging lugs formed thereon of a shape adapted to engage the hollows of either right or left hand objects of the same formation.

In testimony whereof, I have hereunto subscribed my name this 9th day of March, 1918.

EDWARD O. KEATOR.

Witnesses:
   ELIZABETH F. LENFESTEY,
   WILLIAM L. LENFESTEY.